US012616230B2

(12) United States Patent
Spickermann et al.

(10) Patent No.: US 12,616,230 B2
(45) Date of Patent: May 5, 2026

(54) HEMP SEED EXTRACT

(71) Applicant: OHLY GmbH, Hamburg (DE)

(72) Inventors: Dominik Spickermann, Hamburg (DE); Catharina Kleist, Hamburg (DE); Loi Gia Tu, Ahrensburg (DE); Mathilde van Rheenen, Bremen (DE)

(73) Assignee: OHLY GmbH, Hamburg (DE)

( * ) Notice: Subject to any disclaimer, the term of this patent is extended or adjusted under 35 U.S.C. 154(b) by 748 days.

(21) Appl. No.: 17/422,929

(22) PCT Filed: Feb. 18, 2020

(86) PCT No.: PCT/EP2020/054153
§ 371 (c)(1),
(2) Date: Jul. 14, 2021

(87) PCT Pub. No.: WO2020/169553
PCT Pub. Date: Aug. 27, 2020

(65) Prior Publication Data
US 2022/0125083 A1 Apr. 28, 2022

(30) Foreign Application Priority Data

Feb. 21, 2019 (EP) ..................................... 19158698

(51) Int. Cl.
*A23L 27/10* (2016.01)
*A23J 3/14* (2006.01)
(Continued)

(52) U.S. Cl.
CPC .................. *A23L 27/11* (2016.08); *A23J 3/14* (2013.01); *A23J 3/34* (2013.01); *A23L 27/88* (2016.08);
(Continued)

(58) Field of Classification Search
CPC ..... A23L 27/88; A23L 27/11; B01D 11/0288; B01D 11/028; B01D 11/0292; A23J 3/34; A23J 3/14
See application file for complete search history.

(56) References Cited

U.S. PATENT DOCUMENTS 2,887,385 A 5/1959 Rusoff
3,662,673 A * 5/1972 Boyer ....................... A23J 3/26
530/833
(Continued)

FOREIGN PATENT DOCUMENTS

CN 1161810 8/2004
CN 104489837 4/2016
(Continued)

OTHER PUBLICATIONS

International Search Report and Written Opinion in corresponding PCT/EP2020/054153, dated May 13, 2020.
(Continued)

*Primary Examiner* — Vera Stuli
(74) *Attorney, Agent, or Firm* — Knobbe, Martens, Olson & Bear, LLP

(57) ABSTRACT

The present invention relates to a process for preparing a hemp seed extract that is useful as a flavoring composition in food and beverages. The method does not involve the use of re-agents that would impair the taste of the resulting extract, in particular organic solvents. The invention also relates to a hemp seed extract that can be prepared by use of the process of the invention. The invention also relates to the use of the hemp seed extract of the invention as a flavoring composition, in particular in food and beverages. Finally, the invention also relates to foods or beverages comprising a hemp seed extract of the invention.

19 Claims, 1 Drawing Sheet

(51) Int. Cl.

| | |
|---|---|
| *A23J 3/34* | (2006.01) |
| *A23L 27/00* | (2016.01) |
| *B01D 11/02* | (2006.01) |

(52) U.S. Cl.
CPC ........ *B01D 11/028* (2013.01); *B01D 11/0288* (2013.01); *B01D 11/0292* (2013.01)

(56) References Cited

U.S. PATENT DOCUMENTS

| | | |
|---|---|---|
| 2007/0207244 A1 | 9/2007 | Crank |
| 2008/0241339 A1 | 10/2008 | Mitchell et al. |

FOREIGN PATENT DOCUMENTS

| | | | |
|---|---|---|---|
| WO | 02100185 | 12/2002 | |
| WO | WO-2018195657 A1 * | 11/2018 | .............. A23J 1/005 |

OTHER PUBLICATIONS

Yin, et al., "Effects of limited enzymatic hydrolysis with trypsin on the functional properties of hemp (*Cannabis sativa* L.) protein isolate", Food Chemistry, 2007, 106, 3(14), pp. 1004-1101 (abstract attached).

Mintel Group Ltd., "Soft Drink with Tea Flavour and Hemp seed Extract", 2015, GNPD01, Database accession No. 3312317.

Pappalardo, Valeria, Studies on Umami Taste. Preparation of Hydrolyzed Vegetable Proteins (HVPs) and Glutamate-Ribonucleotide Hybrids; PhD Thesis, Academic Year: 2012/2013.

* cited by examiner

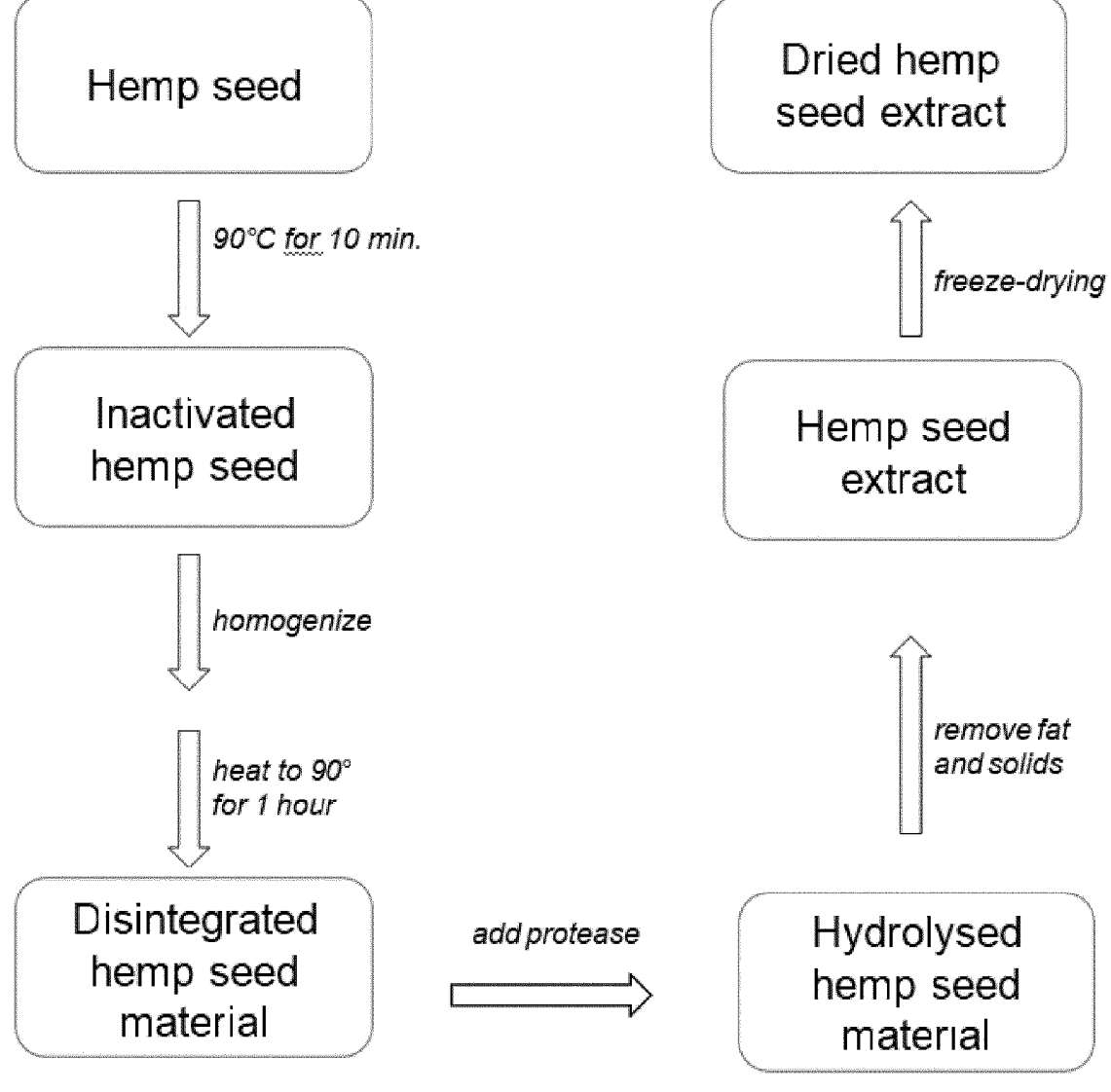

HEMP SEED EXTRACT

RELATED APPLICATIONS

This application is the U.S. National Stage of International Patent Application No. PCT/EP2020/054153, filed Feb. 18, 2020, which is hereby incorporated by reference in its entirety, and which claims priority to European Patent Application No. 19158698.1, filed Feb. 21, 2019.

The present invention relates to a process for preparing a hemp seed extract that is useful as a flavoring composition in food and beverages. The method does not involve the use of re-agents that would impair the taste of the resulting extract, in particular organic solvents. The invention also relates to a hemp seed extract prepared by use of the process of the invention. The invention also relates to the use of the hemp seed extract of the invention as a flavoring composition, in particular in food and beverages. Finally, the invention also relates to foods or beverages comprising a hemp seed extract of the invention.

BACKGROUND OF THE INVENTION

The use of flavor improvers in foods is well known in the art. The food industry uses a number of compounds in order to intensify the meaty or savory flavor of food products. In recent years, however, some consumers tend to avoid the use of substances like glutamic acid, inosine monophosphate and hexanedioic acid in their food, because these compounds are considered as artificial additives.

Efforts have been made by the food industry to replace commonly used flavor improvers by more natural compounds, e.g. from vegetable sources. In particular, hydrolyzed vegetable proteins (HVPs) have been found to confer flavor to foods and at the same time meet the consumer's demand for recognizable additives. Most of the HVPs currently available on the market are derived from plant raw materials, such as soy, wheat, pea, rapeseed, maize or rice. HVPs are commonly prepared by hydrolyzing protein concentrates of the plant material chemically under acidic conditions. This results in a high amount of free amino acids in the extracts, which are the main contributors to taste improvement. On the other hand, HVPs are commonly prepared by using organic solvents which are a burden for the environment and also confer unpleasant bitter off-tastes to the final products.

Despite the progress that has been made in this particular field, there is still a need for additional flavor improving preparations from vegetable sources that could be used in foods and beverages.

The present invention fulfills this need and provides a novel and improved process for preparing a hemp seed extract which is highly useful as a flavoring component. Compared to commonly used HVP preparation processes, the new process is less expensive, less time-consuming and more environmentally acceptable. Importantly, the new process does not involve the use of organic solvents which are commonly used during the preparation of HVPs. The process of the invention has been optimized to omit organic solvents, such as hexane or ethanol, so as to retain the full flavoring taste of the resulting extract. Owing to its natural flavoring characteristics, the hemp seed extract prepared in accordance with the method of the invention is particularly useful as an additive in foods or beverages. At the same time, the use of solvents which are potentially harmful to the environment is significantly reduced by the new process.

DESCRIPTION OF THE INVENTION

It has been found that hemp seeds can provide an excellent basis for the preparation of natural flavoring compounds. Hemp seeds contain a high amount of protein that can be proteoytically digested to result in an extract with excellent organoleptic and flavoring characteristics. Further, as the invention provides a novel method for preparing extracts from hemp seeds that omits the use of organic solvents which are normally used for preparing HVPs from fat-rich materials, the generation of bitter off-tastes can be completely avoided which leads to a significant improvement of the taste and flavoring characteristics.

Thus, in a first aspect, the present invention provides for a new process for preparing a hemp seed extract, said method comprising

- (a) providing a mechanically disintegrated hemp seed material;
- (b) incubating the hemp seed material at a temperature of ≥80° C. for at least 1 hour to release proteins;
- (c) incubating the hemp seed material with one or more proteases to decompose proteins;
- (d) reducing the fat content of the hemp seed material obtained from step (c); and
- (e) obtaining the hemp seed extract,
- wherein the method does not involve the incubation of the hemp seed material with an organic solvent.

In the first step of the above method, a mechanically disintegrated hemp seed material is provided. In principle, any type of hemp seed material can be used as starting material. For example, the process can be carried out with commercially available disintegrated hemp seeds. Disintegrated hemp seed material suitable for use in the method of the invention also includes protein concentrates from hemp seeds and isolated proteins from hemp seeds. Alternatively, complete hemp seeds can be used which are then subjected to disintegration prior to their use in the process of the invention.

The hemp seed material used in step (a) of the method of the invention, either disintegrated or not, preferably has a fat content of at least 15%. More preferably, the total fat content of the hemp seed material used in step (a) is at least 20%, at least 25%, or at least 30% (w/w).

If complete, non-disintegrated hemp seeds are used, the seeds can be hulled or dehulled seeds. If dehulled seeds are used, the seeds may be partially or completely defatted. In a preferred embodiment, the seeds are untreated which means that they have not been subjected to a defatting procedure prior to their disintegration. For disintegration, the seeds can be mixed with an aqueous medium. Preferably, the aqueous medium is water, such as tap water, or an aqueous buffer like, e.g. potassium phosphate buffer. Dependent on the scale of the production facilities, the aqueous mixture can comprise a volume of at least 2 liters, at least 5 liters, at least 10 liters, at least 20 liters, at least 30 liters, at least 40 liters, at least 50 liters, at least 60 liters, at least 70 liters, at least 80 liters, at least 90 liters, or at least 100 liters. However, mixtures having a volume of at least 500 liters or at least 1000 liters are also feasible. The dry matter content of the mixture is not specifically restricted. For example, a dry matter content of between 10% and 95% can be used. The dry matter content of a composition can be determined in accordance with standard procedures using commercially available devices, for example, the Moisture Analyzer (Mettler-Toledo GmbH, Gießen, Germany). Once the dry matter content of a starting suspension has been determined, this suspension can be adjusted to a pre-determined value either by diluting or concentrating the suspension.

In a preferred embodiment, the hemp seed material is briefly heated to a temperature of 80° C. or more before disintegration of the material, and preferably to a temperature of 85° C., 90° C., 95° C. or more in order to inactivate the enzymes which are inherent to the hemp seed cells, in particular proteases. Preferably, the heating step is performed for at least 5 minutes, preferably for at least 10 minutes, and more preferably for at least 20 minutes. An inactivation step for 10 minutes at 90° C. is particularly preferred.

The aqueous hemp seed mixture may then be provided to mechanical disintegration. In this step, the initial hemp seed material is broken down in smaller pieces. The disintegration step can be performed manually, e.g. by use of a mortar and pestle. It is, however, preferred that disintegration is effected by use of a mechanical disintegration device, such as mill, a grinder, a chopper, a macerator, or a bead mill. It is preferred that during disintegration the original hemp seeds are reduced in size by at least a factor 2, 3, 4 or 5.

According to a preferred embodiment, cell disintegration is achieved by use of a bead mill. The use of a bead mill does not require any additives that could impair the food grade quality of the resulting extract. A bead mill normally comprises a chamber that is filled with beads which are moved around by a set of impeller fins. When a cell-containing suspension or mixture is passed through the chamber, the cells are ruptured upon collision with the moving beads. The efficiency of cell rupture can be adjusted by routine measures, for example, by changing the flow rate which determines how fast the cell suspension is passed through the chamber of the bead mill. Normally, a low flow rate leads to high lysis efficiency, since the cells in the suspension have more time to get into contact with the beads. Another factor that has a direct impact on disintegration efficiency is the bead material and size. Beads can be made of different materials, e.g. glass, ceramic or plastic. The beads used for disrupting the hemp seed cells may have different sizes which can range from 0.2-2.0 mm.

Another way of influencing the efficiency of cell rupture is to adapt the impeller architecture. The impeller is normally mounted with plastic fins to move the beads. For improved cell rupture, it is for example possible to provide accelerators onto the rotor. Accelerators are designed to force the beads to collide more often. The impeller rotation speed is another parameter that may be adjusted to improve cell rupture. For the process of the present invention, a rotor speed of between 1-20 m/s can be used, for example, about 1 m/s, about 2 m/s, about 3 m/s, about 4 m/s, about 5 m/s, about 6 m/s, about 7 m/s, about 8 m/s, about 9 m/s, about 10 m/s, about 11 m/s, about 12 m/s, about 13 m/s, about 14 m/s, or about 15 m/s.

A skilled person would be readily able based, on his common knowledge and by routine experimentation, to find optimum conditions and device parameters for disrupting a hemp seed suspension in a bead mill.

According to another preferred embodiment, the hemp seeds are disintegrated by using a standard homogenizer. For example, if the method is performed on lab scale, the hemp seeds can be disintegrated by using a food processor such as a TM5 food processor (Vorwerk, Wuppertal, Germany).

In step (b) of the above method, the disintegrated hemp seed material is heated to a temperature of ≥80° C. for at least 1 hour to enhance cell disintegration and release proteins from the hemp seeds. During this step, the temperature can be, for example, about 80° C., about 85° C., about 90° C., about 95° C. or higher. The incubation of the hemp seed material can be performed for at least 10 minutes, preferably for at least 20 minutes, for at least 30 minutes, or longer. It is even more preferred that the incubation is maintained for at least 1 hour, at least 2 hours, at least 3 hours, at least 4 hours, at least 5 hours, at least 6 hours or longer. Incubation at a temperature of at least 90° C. for 2-6 hours is particularly preferred. Incubation at a temperature of at least 90° C. for 5-6 hours is even more preferred.

In one embodiment, the temperature is stepwise increased during method step (b). For example, step (b) can be carried out by initially incubating the hemp seed material for 1-2 hours at a temperature of 80° C., followed by 1-2 hours at 90° C., followed by 1-2 hours at 95° C. In yet another embodiment the temperature is continuously increased during step (c). For example, the temperature can be increased from 80° C. to 95° C. within 5-6 hours of incubation. The incubation at high temperature assists the mechanical disintegration and promotes the lysis of cells in the hemp seed material.

The heating step (b) for releasing proteins from the hemp seeds can be performed before, simultaneously with or after mechanical disintegration. In one embodiment, step (b) is performed before mechanical disintegration. In another embodiment, step (b) is performed after mechanical disintegration. If heating step (b) is performed before disintegration, no enzyme inactivation step needs to be performed.

It has been found particularly useful to perform heating step (b) at a basic or acidic pH. At high or low pH values, the effect of heating on cell disintegration is enhanced. In one embodiment, the pH is adjusted to an acidic pH of 5 or below 5, preferably below 4.5, such as 4.0, before or during heating step (b). In a particularly preferred embodiment, the acid used for adjusting the pH is citric acid. It has been surprisingly found that the use of citric acid in this step leads to a highly acceptable hemp seed extract in terms of taste improvement properties. The taste is much more acceptable compared to hemp seed extracts that have been prepared using HCl for pH adjustment. In another embodiment, the pH is adjusted to a basic pH before or during heating step (b). In such an embodiment, the pH preferably is 8.0 or higher. Preferably, the pH is 8.5 or higher, such as 9.0.

In a preferred embodiment of the invention, a ribonuclease (RNase) or desoxyribonucelase (DNase) enzyme is added to the hemp seed material, preferably after step (b) of the above process. By addition of such nuclease, the amount of free nucleotides in the final product is increased. This may have advantages in terms of flavoring and taste improvement. Nuclease enzymes suitable for such purpose can be obtained from different manufacturers. Suitable enzymes include PureLink RNase A from Thermo Fisher Scientific (Bremen, Germany) or RNase A from Sigma Aldrich (Taufkirchen, Germany). A skilled person will have no problems to determine the optimum amount of the RNase enzyme to be added to the hemp seed suspension. Suitable amounts of the RNase enzyme will normally be in the range of about 0.1% to 1% weight per weight of dry matter of the disintegrated hemp seed material.

After heating step (b), the hemp seed material is incubated in step (c) with one or more proteases to decompose the proteins released from the cells of the hemp seed material. As used herein, the term "protease" means an enzyme that catalyzes the degradation of a protein or peptide. Depending on the protease selected for the decomposition of the hemp seed proteins, it may be necessary to adjust an appropriate pH of the mixture so as to provide for optimum conditions for the enzymatic break down of the proteins. Depending on the protease, step (c) can be conducted at conditions ranging from pH 3-8. Where an acidification of the mixture is desired, it is preferred to use citric acid, since citric acid leads to especially favorable extracts in terms of taste properties.

Preferably, the protease incubation is performed at a dry matter content of about 4-20%, preferably about 6-18%, and more preferably to about 8-16%. The dry matter content of the composition can be adjusted as described above.

The enzyme that is added to the hemp seed material in step (c) may include one or more endoprotease, one or more exoprotease or a mixture of endoproteases and exoproteases. As used herein, an "endoprotease" means any enzyme that is capable of degrading an internal peptide bond in a protein or peptide. In contrast, an "exoprotease" is an enzyme that is capable of degrading a peptide bond located at one of the termini of a protein or peptide. The endoproteases or exo-proteases to be used in the process of the present invention can be derived from different sources. For example, the proteases may be derived from a fungal, plant, or animal source. Examples for commercially available proteases comprise Flavourzyme® (Novozymes A/S), ProteAX (Amano Enzyme Inc.), ProHydrolase (Deerland Enzymes Inc.), Sumizyme LPL-G (Shin Nihon Chemical CO., LTD.), FlavorPro 795 MDP (Biocatalysts Ltd.), FoodPro Alkaline Protease (Danisco A/S), or others.

The protease or protease mixture can be added to the hemp seed material in a concentration of between 0.1 and 5% protease preparation per total dry matter of the compo-sition. Preferably, the concentration is between 0.2 and 4% protease preparation per total dry matter of the composition, more preferably between 0.3 and 3%, such as 2%. The suspension is then incubated with the protease or protease mixture under conditions that allow protein decomposition. These conditions will preferably comprise a temperature between about 30-65° C., more preferably between about 40-60° C. The incubation time may be between 1-36 hours, preferably between 4-30 hours, more preferably between 8-24 hours, and even more preferably between 12 and 20 hours. It is furthermore preferred that the incubation with the protease or protease mixture is performed under agitation of the suspension.

After decomposition of the proteins has taken place, the fat and, optionally, solid matter content of the proteolytically decomposed hemp seed material obtained from step (c) is reduced. In a preferred embodiment, the fat content is reduced to below 20% weight per weight of dry matter of the disintegrated hemp seed material, preferably below 15%, more preferably below 10%, and even more preferably to below 8% weight per weight of dry matter of the disinte-grated hemp seed material.

In practice, the lipophilic components are separated off from the proteolytically decomposed hemp seed material. Different techniques can be used for removing the lipophilic components and, optionally, solid matter from the suspen-sion. For example, suitable techniques include filtration, centrifugation, the use of separators, decanter centrifuges, or combinations of these methods.

In a simple embodiment, the suspension is subjected to centrifugation, for example, at 1,000-10,000 g, preferably at 2,000-8,000 g, and more preferably at 3,000-6,000 g. The pellet obtained after centrifugation is discarded. It contains the insoluble components of the cells, such as the cell walls and cell debris. Also, an oil phase accumulates on top of the aqueous phase which is also discarded. The remaining aqueous phase is the hemp seed extract of the present invention.

During large scale preparations, lipophilic components and solid matter can be removed from the proteolytically decomposed hemp seed material by a continuous or non-continuous two-step process. In the first step the suspension is subjected to decanter centrifugation to remove solid matter. In a second step the suspension is then subjected to a large scale separator (e.g. a jet separator or clarification separator) to separate the lipophilic components. In a simple embodiment, the suspension is subjected to a large scale separator centrifugation, for example, at 1,000-10,000 g, and preferably at 2,000-8,000 g, and more preferably at 3,000-6,000 g.

After reducing the fat content of the hemp seed material as described above, the extract is obtained in step (e) of the method of the invention. The extract can be immediately used as an additive to foods or beverages, or it can be further processed if necessary, e.g. by sterilization or drying.

In one embodiment, the hemp seed extract obtained in step (e) of the method of the invention is sterilized. Steril-ization can be affected by heat treatment, by UV irradiation, or by other common techniques. It is also possible to achieve sterilization by filtering the aqueous phase through a filter having a pore size of 0.22 μm or less.

In another embodiment, the aqueous phase obtained in step (e) of the method of the invention may also be dried to provide an extract in the form of a powder. The powder has a significantly improved shelf life, since the powder is protected from growth of microbial contaminants which could influence food safety and decomposition of its com-ponents. According to the invention, it is preferred that drying of the aqueous extract obtained from step (e) of the method of the invention is effected by spray-drying or freeze-dying.

The principle of spray drying is based on the dispersion of a solution into fine droplets which are introduced into a flow of hot air. The solvent evaporates from the substrate droplets so that dry product clusters remain. Standard spray drying devices can be used, such as the Mini Spray Dryer B-290 from Büchi Labortechnik GmbH (Essen, Germany) or the Mobile Minor™ Spray Dryer from GEA (Berlin, Germany).

Freeze drying or lyophilization is a process which removes water from a product to extend shelf life. Freeze drying encompasses freezing the product, reducing the pres-sure and adding heat to allow the frozen water in the material to sublimate. Various methods can be applied for freezing the product. For example, freezing can be achieved by using a standard freezer or a chilled bath. Cooling the product below its triple point ensures that sublimation will occur upon heating. To prevent the formation of large crystals that may damage the structure of the product to be dried, freezing is done rapidly. About 95% of the water in the product is removed when the frozen water sublimates. Most materials can be dried to 1-5% residual moisture. Standard freeze drying devices can be used, such as the Lyovac™ devices from GEA (Berlin, Germany), the Gamma 2-20 Freeze dryer LCM-1 from Christ (Osterode am Harz, Germany), or the Christ Martin™ Alpha 1-2 Lyophilisator from Fisher Sci-entific GmbH (Schwerte, Germany).

One of the particular advantages of the above method of the invention resides in the fact that no organic solvents are used for the production of the hemp seed extract. For fat extraction, commonly used organic solvents comprise, amongst others, ethanol, methanol, propanol and butanol. Other organic solvents that may be used for that purpose include iso-propanol, n-propanol, benzyl alcohol, ethyl acetate, n-butyl acetate, amyl acetate, propyl acetate, acetone, methyl ethyl ketone, heptane, iso-butyl acetate, iso-propyl acetate, toluene, methyl acetate, iso-butanol, n-amyl alcohol, n-butyl alcohol, hexane, and mixtures thereof. None of these solvents will be used in the process of the invention. The lack of organic solvents in the preparation method provides for an improved taste of the hemp seed extract and at the same time avoids the use of environmentally incompatible reagents.

It is further preferred that the method of the invention does not involve any protein precipitation step, i.e. no protein precipitation is used between step (a) and step (e) of the above recited method. It is further preferred that the method of the invention does not involve any sieving step, i.e. no sieving occurs between step (a) and step (e) of the above recited method. It is further preferred that the method of the invention does not involve any ultrasonic extraction step, i.e. no ultrasonic extraction occurs between step (a) and step (e) of the above recited method.

In another aspect, the invention provides a hemp seed extract obtainable by a method as described above.

In yet another aspect, the invention provides a hemp seed extract which is free of organic solvents, comprising (a) a protein concentration of at least 50% (w/w) of the total extract;

(b) a concentration of free glutamate of 0.1 to 10.0% (w/w) of the total extract; and (c) a reducing sugar concentration lower than 20% (w/w) of the total extract.

The above hemp seed extract has a protein concentration of at least 50% (w/w) of the total extract, and more preferably at least 55% or at least 60%.

The concentration of free glutamate is in the range from 0.1 to 10.0% (w/w) of the total extract, preferably from 0.5 to 5.0%, and more preferably from 1.0 to 4.0%. Stated differently, the concentration of free glutamate in the hemp seed extract is at least 0.1%, at least 0.2%, at least 0.3%, at least 0.4%, at least 0.5%, at least 0.6%, at least 0.7%, at least 0.8%, at least 0.9%, at least 1.0%, at least 1.5%, at least 2.0%, at least 2.5%, at least 3.0%, at least 3.5%, at least 4.0%, at least 4.5%, at least 5.0%, at least 5.5%, at least 6.0%, at least 6.5%, at least 7.0%, at least 7.5%, or at least 8.0% (w/w) of the total extract.

The hemp seed extract of the present invention has a concentration of reducing sugar which is lower than 20% (w/w) of the total extract, and more preferably lower than 15%, lower than 12% or lower than 10%. The amount of reducing sugars can be measured in accordance with common methods described in the art. Preferably, the amount of reducing sugars is determined according to the dinitrosalicylic acid method. The method is based on the use of dinitrosalicylic acid which is converted to 3-amino-nitrosalicylic acid. The absorbance of the latter is determined and is a measure for the amount of reducing sugars.

In a preferred embodiment, the concentration of fat in the hemp seed extract is lower than 10% (w/w) of the total extract, preferably lower than 8% (w/w), more preferably lower than 5% (w/w), and even more preferably lower than 3% (w/w).

It is furthermore preferred that the concentration of RNA is below 1.5%, and preferably below 1.0% (w/w) of the total hemp seed extract. Similarly, it is preferred that the concentration of free nucleotides is below 1.5%, and preferably below 1.0% (w/w) of the total hemp seed extract.

A particular preferred extract comprises a protein concentration of at least 50% (w/w) of the total extract, a concentration of free glutamate in the range from 0.5 to 5.0% (w/w) of the total extract, a concentration of RNA of below 1.5% (w/w) of the total extract, a concentration of free nucleotides of below 1.5% (w/w) of the total extract, and a fat concentration of below 10% (w/w) of the total extract.

Another particular preferred extract comprises a protein concentration of at least 55% (w/w) of the total extract, a concentration of free glutamate in the range from 2.0 to 4.0% (w/w) of the total extract, a concentration of RNA of below 1.0% (w/w) of the total extract, a concentration of free nucleotides of below 1.0% (w/w) of the total extract, and a fat concentration of below 10% (w/w) of the total extract.

In another aspect, the present invention relates to the use of a hemp seed extract as defined elsewhere here in as a flavoring composition, in particular for flavoring food products. Accordingly, the invention also relates to the use of a hemp seed extract is defined elsewhere herein as a food additive. Suitable food products to which the hemp seed extract of the present invention can be added include, for example, soups, pizza, chips, dry condiments, meat, meat replacements, and others. Suitable beverage products to which the hemp seed extract of the present invention can be added include, for example, beer, soft drinks, juices, teas and milk-based beverages.

The hemp seed extract of the invention can simply be added to the respective food products during their preparation. For example, the hemp seed extract can be added in dried form to instant products such as instant soups. In addition, the hemp seed extract can be added in dried to spice mixtures or chips condiments. Alternatively, the hemp seed extract can also be used as a liquid suspension in appropriate amounts for directly flavoring a food or beverage.

The invention therefore also provides food or beverage products that contain hemp seed extract as defined herein above. Such food products may be soups, pizza, chips, dry condiments, meat, meat replacements, and the like. Suitable beverage products may be beer, soft drinks, juices, teas and milk-based beverages.

BRIEF DESCRIPTION OF THE FIGURE

FIG. 1 shows a preferred embodiment of the process for preparing a hemp seed extract according to the invention. The hemp seed material is inactivated by heat treatment and then subjected to mechanical disintegration by homogenization. The material is heated another time and subsequently incubated with proteases. After removal of the fats and solid components, the extract is dried by freeze-drying.

EXAMPLES

The following examples are provided in order to illustrate the invention. It should however be understood that the scope of the invention is not limited by the examples. A skilled person will understood that several modifications can be made without deviating from the scope of the invention.

Example 1: Preparation of a Hemp Seed Extract Under Alkaline Protein Extraction Conditions Hulled hemp seeds of organic quality (supplier: MeaVita) were used as raw material. 187.5 ml water were combined with 62.5 g raw material to provide a mixture with a dry matter content of 25%. The mixture is heated to 95° C. for 10 minutes to inactivate enzymes in the hemp seed material.

After enzyme inactivation, the mixture was homogenized using a standard food processor (TM5, Vorwerk, Germany) at 10200 rpm for 5 minutes.

250 ml water were added to the disintegrated material to adjust the mixture to a dry matter content of 12.5%. The pH of the homogenized suspension was adjusted to pH 9.0 using a 10% sodium hydroxide solution. For complete cell rupture and protein extraction, the mixture was heated to 95° C. and incubated for 60 minutes.

The suspension was then adjusted to pH 5 using citric acid and heated to 40° C. while stirring at 160 rpm. Under continuous stirring, a Sumizyme LPL-G (Shin Nihon Chemical Co., Ltd.) powder protease preparation was added to a final concentration of 2% protease preparation per total dry matter of the composition. To hydrolyze the proteins, the suspension was then incubated for 20 hours at 40° C. and 160 rpm while the pH was maintained at 5.

The hydrolyzed suspension was then separated using a standard lab centrifuge (10 minutes, 4700 g, room temperature, Heraeus Multifuge X3R, ThermoFisher Scientific). The solid pellet and the top fat and oil layers were removed to gain the aqueous product.

In order to get the final powdered hemp seed extract, the aqueous phase was sterilized in a standard UHT device at 130° C. for 40 seconds and then dried using a standard lab freeze dryer (Gamma 2-20, LCM-1 Christ).

Example 2: Preparation of a Hemp Seed Extract Under Acidic Protein Extraction Conditions Example 1 was repeated with the exception that the pH of the homogenized suspension was adjusted to pH 4.0 using a 10% citric acid solution. Prior to protease addition, the suspension was adjusted to pH 5 using sodium hydroxide.

Hydrolysis, fat removal, sterilization, and freeze-drying were performed as described in Example 1.

Example 3: Sensory Testing

To evaluate the sensory attributes of the hemp seed extract, the powder obtained after freeze-drying was mixed into a standard meat broth at a concentration of 0.25% (w/w). The required amount of hemp seed extract was dissolved in a standard meat broth solution and served to the sensory-panelists.

To obtain statistically relevant data, each panel consisted of at least 12 trained individuals capable of assessing the flavor profiles of the given food application. Based on the assessment scores of all panelists, QDA/CAQDAS flavor profiles were calculated and compared to the flavor profile of the control (standard meat broth without the hemp seed extract). Differences between the control and a specific food application were interpreted as the effect of the hemp seed extract in the food application.

The invention claimed is:

1. A method for preparing a hemp seed extract suitable for use in a food or beverage product, said method comprising:
   (a) providing a mechanically disintegrated hemp seed material having a fat content of at least 15% (w/w);
   (b) incubating the hemp seed material at a temperature of ≥80° C. and a pH of ≤5.0, for at least two hours to release proteins;
   (c) incubating the hemp seed material with one or more proteases to decompose the released proteins; and (d) reducing the fat content of the hemp seed material obtained from step (c) to obtain a hemp seed extract, wherein the method does not involve the incubation of the hemp seed material with an organic solvent.

2. The method of claim 1, wherein a dry matter content of the mixture in step (c) is adjusted to about 4-20%.

3. The method of claim 1, wherein the hemp seed material has been disintegrated by milling or grinding.

4. The method of claim 1, wherein the material is incubated at a temperature of ≥80° C. prior to mechanical disintegration.

5. The method of claim 1, wherein step (c) comprises incubation with one or more endoproteases and/or one or more exoproteases.

6. The method of claim 1, wherein step (b) is carried out at a temperature of 95° C.

7. The method of claim 1, wherein step (b) is carried out at a pH of ≤5.0 for 3 hours or more.

8. The method of claim 1, wherein the material in step (c) is incubated for at least 1 hour.

9. The method of claim 1, wherein the fat content of the material is reduced by separators in step (d).

10. The method of claim 1, wherein the hemp seed extract obtained in step (d) is dried.

11. The method of claim 1, wherein step (b) is carried out at a pH of ≤4.5.

12. The method of claim 1, wherein the hemp seed extract obtained at step (d) comprises a protein concentration of at least 50% (w/w) of the total hemp seed extract.

13. The method of claim 12, wherein the hemp seed extract obtained at step (d) comprises a concentration of free glutamate of 0.1 to 10.0% (w/w) of the total hemp seed extract.

14. The method of claim 13, wherein the hemp seed extract obtained at step (d) comprises a reducing sugar concentration lower than 20% (w/w) of the total hemp seed extract.

15. The method of claim 14, comprising adding the hemp seed extract as an additive to a food product.

16. The method of claim 1, wherein reducing the fat content of the hemp seed material obtained from step (c) comprises reducing the fat content of the hemp seed extract to below 8%.

17. The method of claim 16, wherein the fat content of the hemp seed extract is reduced below 8% at pH≤5.0.

18. The method of claim 17, wherein the hemp seed extract is reduced to pH≤5.0 using citric acid.

19. A method for preparing a hemp seed extract suitable for use in a food or beverage product, said method comprising:
   (a) providing a mechanically disintegrated hemp seed material having a fat content of at least 15% (w/w);
   (b) incubating the hemp seed material at a temperature of ≥80° C. and a pH of ≤5.0, for at least two hours to release proteins, wherein the hemp seed material is reduced to the pH≤5.0 using citric acid;
   (c) incubating the released proteins with one or more proteases to decompose the released proteins; and
   (d) reducing the fat content of the hemp seed material obtained from step (c) to obtain a hemp seed extract, wherein the method does not involve the incubation of the hemp seed material with an organic solvent.

* * * * *